United States Patent Office 2,828,314
Patented Mar. 25, 1958

2,828,314 p-(N-LOWER ALKYL-N-DILOWER ALKYL AMINO ETHYL) AMINOBENZALDEHYDE ISONICOTIN-OYL HYDRAZONE

Harry Louis Yale and Jack Bernstein, New Brunswick, N. J., assignors to Olin Mathieson Chemical Corporation, New York, N. Y., a corporation of Virginia No Drawing. Application March 8, 1952
Serial No. 275,682

2 Claims. (Cl. 260—295)

This invention relates to antimycobacterial, especially antituberculous, agents and methods for their preparation.

The development of agents for the treatment of tuberculosis has been receiving extensive consideration for some time. Thus far, the most widely used have been streptomycin and dihydrostreptomycin. However, their utility has been limited owing to their toxicity, and patients must be watched carefully, especially where prolonged treament is required, or where there is an impairment of kidney function. Auditory damage has also been found to result from their use. Furthermore, they suffer from the disadvantage that for optimum results they must be administered by intermittent intramuscular injection rather than perorally.

It is the object of this invention to provide a class of relatively non-toxic antimycobacterial, especially antituberculous, agents (and methods of preparing them) which are highly efficacious when administered perorally. The agents of this invention, which may also be used in the treatment of leprosy, comprise the following compounds and formulations thereof:

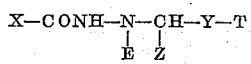

wherein X is the residue of a monocyclic heterocyclic-carboxylic (especially a pyridine-carboxylic or furoic) acid stripped of its carboxyl group, Y is phenylene or substituted phenylene, E and Z each represent hydrogen or together represent an additional N—C bond, and T is a member of the group consisting of amino, alkylamino, aminoalkylamino and acylamino groups.

The compounds of this invention are heterocyclic carboxylic acid hydrazones (especially isonicotinic acid hydrazones) of aminobenzaldehydes, and the corresponding N-heterocyclic-acyl N'-substituted hydrazines.

Following, in outline form, is the process by which the compounds of the invention may be obtained:

(I)  XCONHNH₂+OHC—Y—T→
XCONHN=CH—Y—T (II) XCONHN=CH—Y—T+H₂→
XCONHNHCH₂—Y—T wherein X, Y and T have the same meaning as hereinbefore given.

The hydrazones of this invention may be prepared by reacting a heterocyclic carboxylic acid hydrazide with the appropriate aminobenzaldehyde. Thus, the hydrazide reactant may be the hydrazide of any heterocyclic acid such as nicotinic, isonicotinic, picolinic, furoic, thiophene-carboxylic, pyrrolecarboxylic, nipecotic, isonipecotic, and pyrrolidine-carboxylic; and the aminobenzaldehyde reactants include the unsubstituted amino benzaldehyde as well as N-substituted (especially para-N-substituted) and/or C-substituted derivatives thereof, such as methyl-aminobenzaldehyde, dimethylaminobenzaldehyde, diethyl-aminobenzaldehyde, acetamidobenzaldehyde, monochlor-acetamidobenzaldehyde, propionamidobenzaldehyde, stearoylamidobenzaldehyde, o-hydroxy-p-aminobenzaldehyde, o-methyl-p-aminobenzaldehyde and N-methyl-N-dialkylaminoethyl-p-aminobenzaldehyde.

Wide latitude is permissible with respect to reaction conditions. Thus, in preparing the hydrazones, the proportions of reactants used may be altered as desired; and, although water is preferred as the reaction medium, other solvents such as the lower alkanols, dioxane, the Cellosolves and dimethylformamide, may be used.

The N-heterocyclic-acyl N'-substituted hydrazines may be obtained by reduction of the corresponding hydrazones, which reduction is preferably effected by treatment with hydrogen in the presence of a catalyst, such as platinum dioxide and palladium on charcoal until the required amount of hydrogen has been absorbed. The reduction may also be effected by treatment with nascent hydrogen provided by sodium in liquid ammonia, sodium amalgam, zinc-copper couple, etc.; or electrolytic reduction may be used. More complete hydrogenation would not only result in saturation of the C=N but could also transform the heterocyclic nucleus to hydrogenated forms thereof (e. g. pyridine to piperidine). As solvent in the hydrogenation one may use, inter alia, a lower alkanol (e. g. methanol, ethanol, and isopropanol), water, acetic acid, dioxane, and cyclohexanol.

In synthesis of the N-heterocyclic-acyl N'-substituted hydrazines, one may prepare and isolate the hydrazone and then hydrogenate to obtain the desired hydrazine; or one may carry out the hydrazone formation and hydrogenation thereof in a single step, or in the same reaction medium.

Acid-addition salts may be formed of those compounds of this invention which contain a basic nitrogen atom, using conventional methods. Thus, salts with mineral acids may be formed in aqueous solution or under anhydrous conditions, for example, by passing hydrogen chloride gas into an ethereal solution of the free base. Clearly, other salts, such as those of sulfuric acid, phosphoric acid, p-aminosalicylic acid, p-toluene-sulfonic acid, methionine, sulfamic acid, lactic caid, citric acid, gluconic acid, etc., may be prepared.

The compounds may be used perorally as chemotherapeutic agents for tuberculosis, or may be employed as environmental antituberculous agents, especially in hospitals and dairies. Thus, for peroral administration, the compounds may be embodied in various pharmaceutical formulations, which term, as used herein, includes dosage-unit formulations as well as subdivisible formulations of the compound in a suitable vehicle or carrier (e. g., elixirs, suspensions, distilled-water solutions, saline solutions, etc.). Preferred are the dosage-unit formulations, as capsules and tablets. These may be prepared in the conventional manner. Thus, capsules may be made containing a mixture of the compound and starch (or other suitable excipient) in appropriate proportion. Also, one-piece gelatin capsules may be prepared containing the desired dosage in sufficient corn oil to render the compound capsulatable. Tablets may be prepared to contain desired quantities of the compound, using lactose and starch, for example, as excipients, and may be scored to enable one to take fractional dosages.

Therapeutic dosages of the compounds of this invention are readily determinable, peroral administration of the isonicotinoyl hydrazone of p-aminobenzaldehyde in a dosage of the order of 250 mg./kg./day being therapeutically effective.

In sterile aqueous solution, or in physiological saline solution, the compound may be used for intrathecal injection or instilled into empyema cavities, large lung cavities, or draining fistulae.

The compounds of this invention may also be used as environmental antituberculous agents by dissolving them in a suitable solvent for use as a spray composition, or dissolving them in compatible detergent solutions for use in cleansing.

Following are specific working examples illustrative of the manner in which the novel products may be prepared:

EXAMPLE 1

*p-Acetamidobenzaldehyde isonicotinoylhydrazone*

A warm solution of 13.7 g. isonicotinic acid hydrazide in 50 ml. water is mixed with a solution of 16.3 g. p-acetamidobenzaldehyde in 250 ml. water. A precipitate forms almost immediately. The reaction mixture is cooled in an ice bath for at least 15 minutes to complete precipitation and the solid material (M. P. 292–294° C.) is isolated by filtration. Recrystallization from a mixture of 480 ml. dimethylformamide and 120 ml. water yields about 25 g. purified hydrazone (M. P. 292–294° C.).

EXAMPLE 2

*p-Acetamidobenzaldehyde furoylhydrazone*

To a solution of 23.2 g. 2-furoic acid hydrazide in 200 ml. warm water is added a solution of 32.6 g. p-acetamidobenzaldehyde in 250 ml. warm 50% aqueous ethanol. The resulting pale yellow solution is warmed gently on a steam bath for about 5 minutes, causing formation of a heavy, pale yellow precipitate. The precipitate is separated from the warm reaction mixture by filtration, then washed with about 200 ml. warm 25% aqueous ethanol to obtain the crude product. The crude product is recrystallized from glacial acetic acid (50 ml./g.), filtered, then washed successively with water, ethanol and ethyl ether to obtain the purified hydrazone in about 75% yield.

EXAMPLE 3

*p-Diethylaminobenzaldehyde isonicotinoylhydrazone*

To a solution of 27.4 g. isonicotinic acid hydrazide in 400 ml. water is added a solution of 35.4 g. p-diethylaminobenzaldehyde in 150 ml. ethanol. The oil, which immediately separates from the reaction mixture, becomes granular on cooling. The reaction mixture is diluted with 250 ml. ethanol and the diluted mixture is heated to cause solution, then treated with decolorizing charcoal (Darco), and filtered while hot. The granular precipitate which forms on cooling is separated by filtration to obtain about 43 g. crude product (M. P. 152–155° C.). Recrystallization from a mixture of 450 ml. ethanol and 300 ml. water yields the purified hydrazone (M. P. 180–181° C.).

EXAMPLE 4

*p-Dimethylaminobenzaldehyde isonicotinoylhydrazone*

To a solution of 27.4 g. isonicotinic acid hydrazide in 500 ml. water is added a solution of 29.8 g. p-dimethylaminobenzaldehyde in 200 ml. ethanol. The oil which separates from the reaction mixture crystallizes immediately. The reaction mixture is diluted with 250 ml. ethanol, and the diluted mixture is heated to cause solution, then treated with decolorizing charcoal (Darco), and filtered while hot. The crystalline precipitate, which forms on cooling, is separated by filtration to obtain the crude product (M. P. 198–200° C.). Recrystallization from 50% aqueous ethanol yields the purified hydrazone (M. P. 200–201° C.).

EXAMPLE 5

*p-(N-methyl-N-diethylaminoethyl)-aminobenzaldehyde isonicotinoylhydrazone*

To a solution of 12.9 g. isonicotinic acid hydrazide in 500 ml. water is added 22 g. p-(N-methyl-N-dimethylaminoethyl)-aminobenzaldehyde, causing an oil to separate. This reaction mixture is then diluted with 200 ml. ethanol and the diluted mixture is heated to cause solution, then treated with decolorizing charcoal (Darco), and filtered while hot. The crystalline precipitate which forms on cooling and standing, is separated by filtration to obtain the crude product (M. P. 79–81° C.). Recrystallization from 350 ml. of a mixture of 4:3 water-ethanol yields the purified hydrazone (M. P. 80–81° C.).

EXAMPLE 6

*N-isonicotinoyl-N′-(p-diethylaminobenzyl)hydrazine*

A solution of 20 g. p-diethylaminobenzaldehyde isonicotinoylhydrazone (cf. Example 3) in 150 ml. warm absolute ethanol is treated with hydrogen at 70° C. and a pressure corresponding to 250 cm. mercury with shaking, in the presence of 100 mg. platinum dioxide. In approximately 5 hours, 0.127 g. hydrogen is absorbed. The catalyst is then separated from the warm solution by filtration, and the resulting solution is concentrated to dryness under reduced pressure. The residue is crystallized by trituration with about 100 ml. dry ethyl ether to yield the N-isonicotinoyl-N′-(p-diethylaminobenzyl)hydrazine.

This invention may be variously otherwise embodied within the scope of the appended claims.

We claim:

1. Compounds of the formula wherein one Z is N-di(lower alkyl)aminoethyl and the other Z is lower alkyl.

2. The compound p-(N-methyl-N-diethylaminoethyl)-aminobenzaldehyde isonicotinoylhydrazone.

References Cited in the file of this patent

Adkins: Reactions of Hydrogen (U. of Wis.), p. 87 (1946).

Meyer: Monatsh. für Chemie, vol. 33, pp. 400–402 (1912).

Adkins: "Reactions of Hydrogen" (U. of Wisc.), pp. 55–6 (1937).